United States Patent [19]

Zieschang

[11] 4,257,725
[45] Mar. 24, 1981

[54] HAY HANDLING APPARATUS

[76] Inventor: Edwin C. Zieschang, Rte. 1, Box 48, Chappell Hill, Tex. 77426

[21] Appl. No.: 5,593

[22] Filed: Jan. 22, 1979

[51] Int. Cl.$^3$ .......................... A01D 87/12; B66F 7/06
[52] U.S. Cl. ...................................... 414/84; 414/704; 414/723
[58] Field of Search ...................... 414/25, 44, 84, 111, 414/132, 497, 704, 721, 723, 725, 24.5; 294/50, 50.5

[56] References Cited

U.S. PATENT DOCUMENTS

| | | | |
|---|---|---|---|
| 2,409,302 | 10/1946 | Millikin | 414/704 |
| 2,654,494 | 10/1953 | Stratman | 414/704 X |
| 2,671,570 | 3/1954 | Richey | 414/704 X |
| 2,676,719 | 4/1954 | Wagner et al. | 414/704 X |
| 2,750,057 | 6/1956 | Stuart | 414/704 X |
| 2,817,449 | 12/1957 | Meyer et al. | 414/723 |
| 3,180,504 | 4/1965 | Gruben et al. | 414/699 |
| 3,642,160 | 2/1972 | Rockwell et al. | 414/704 |
| 3,921,837 | 11/1975 | Vandewater | 414/24.5 |

FOREIGN PATENT DOCUMENTS 265372 7/1963 Australia .................................. 414/84

*Primary Examiner*—Leslie J. Paperner
*Attorney, Agent, or Firm*—Carl B. Fox, Jr.

[57] ABSTRACT

Hay handling apparatus, by use of which baled hay may be lifted and transported, stacked and unstacked, in a simple and dependable manner. The apparatus is adapted to be connected to a standard front end loader of a tractor, without requirement for additional hydraulic cylinders or controls other than those provided with the loader for operation of the apparatus. A frame body carries horizontally disposed elongated sharpened bars in the form of spikes adapted to pierce through bales of hay so that the hay may be lifted and transported, and includes means for imposing pressure against the bales of hay for withdrawal of the bars from the bales of hay. The apparatus is made in sizes so that stacked bales of hay may be handled, and is designed such that by its use baled hay may be stacked within an enclosed space, such as in a barn, completely to the ceiling thereof.

14 Claims, 6 Drawing Figures

HAY HANDLING APPARATUS

BACKGROUND OF THE INVENTION

The apparatuses presently available for handling baled hay are not entirely satisfactory. Apparatuses are available by means of which stacked bales of hay may be lifted and transported by being grasped between horizontally spaced side members, lifting of the bales depending on compression of the bales between the side members. Other apparatuses are available wherein claws which pierce the bales from their upper sides are employed. All of these devices require hydraulic cylinders and controls in addition to those provided for operation of a front end tractor loader which supports the apparatus. No apparatus is available which can lift and transport stacks of bales several bales wide and several bales high, as is provided according to the present invention.

SUMMARY OF THE INVENTION

According to the invention, an apparatus is provided which can dependably lift, transport, and be disengaged from, stacked bales of hay. The apparatus provides horizontally disposed spaced parallel bars which are sharpened at their ends so that the bars may be used as spikes for piercing the bales in a horizontal direction, whereby the bales are firmly engaged and there is little or no chance that the stacked bales will be dropped during handling. The apparatus is adapted to handle stacked bales of hay wherein stacks of hay several bales in width and several layers in height may be readily handled. The apparatus utilizes a standard front end tractor loader both for maintaining the load in level condition and for removal of the load from the spikes once the transport destination has been reached. No hydraulic cylinders or controls are required other than the hydraulic cylinders and controls normally employed in standard front end loaders. Therefore, the apparatus may be made more economically, since not only are additional hydraulic devices not required, but controls for their operation are also not required. A pipe or bar is disposed transversely above and across the spikes, slidably connected to the spikes. Pivotal linkages are connected to the upper cylinders of the loader and are arranged such that the upper cylinders support the load in level condition. After the load has been deposited on the ground, or on a platform or vehicle bed, or on stacked bales of hay already in place, extension of the upper cylinders causes movement of the transverse bar or pipe to withdraw the spikes from the load.

A principal object of the invention is to provide apparatus for handling baled hay. Another object of the invention is to provide such apparatus capable of handling stacks of baled hay of multiple bale widths and heights. A further object of the invention is to provide such apparatus which fully supports the stacked bales of hay during lifting and transport thereof. Yet another object of the invention is to provide such apparatus through use of which stacked bales of hay may be readily lifted and unloaded in desired elevated or non-elevated locations. A further object of the invention is to provide such apparatus which is efficient, dependable, and economical, and which may be readily used by relatively unskilled personnel.

Other objects and advantages of the invention will appear from the following detailed description of a preferred embodiment thereof, reference being made to the accompanying drawings.

BRIEF DESCRIPTIONS OF THE DRAWINGS

DESCRIPTION OF THE PREFERRED EMBODIMENT

Figure 1:
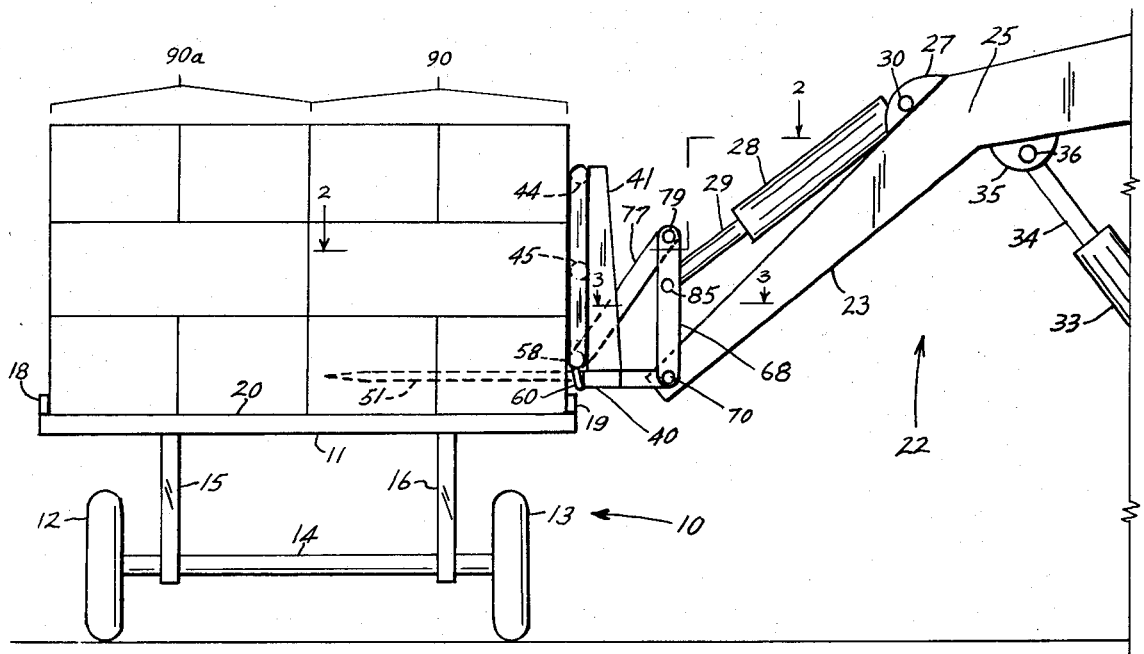
FIG. 1 is a side elevation of an apparatus of preferred form according to the invention, the apparatus being shown as connected for use.

Referring now to the drawings in detail, in FIG. 1 there is schematically shown a trailer 10 having bed 11 and having wheels 12, 13 mounted on axle assembly 14 supported from the bed by members 15, 16. The trailer will usually have another pair of wheels similarly supported. Bed 11 has side members 18, 19 projecting above its upper surface 20 along its opposite sides. Trailer 10 does not form part of the invention and is illustrated as an example of a conveying vehicle which may take any suitable form, for example, it may be a trailer or truck, or the like of any suitable form.

A tractor (not shown) supports the apparatus provided according to the invention when the apparatus is in use. The tractor is provided with a hydraulic loader apparatus 22, the forward portion of which is illustrated schematically in the drawings. Any form of loader which can be accommodated to perform the necessary support and motion functions may be used.

Figure 2:
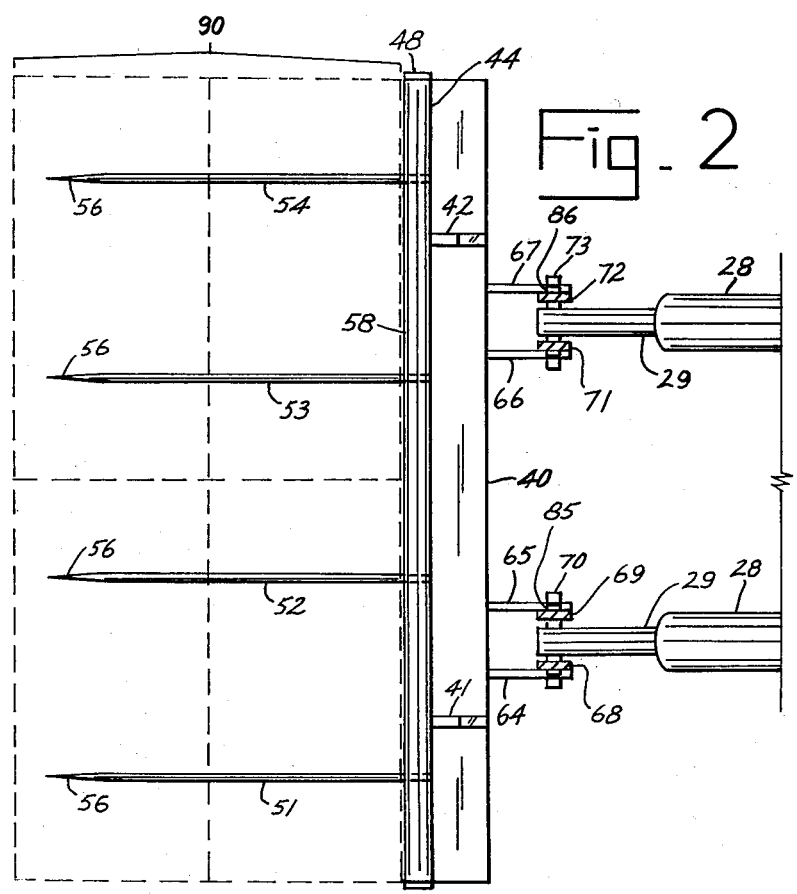
FIG. 2 is a plan view, partly in horizontal cross section, of the apparatus shown in FIG. 1, taken at line 2—2 of FIG. 1.
Figure 3:
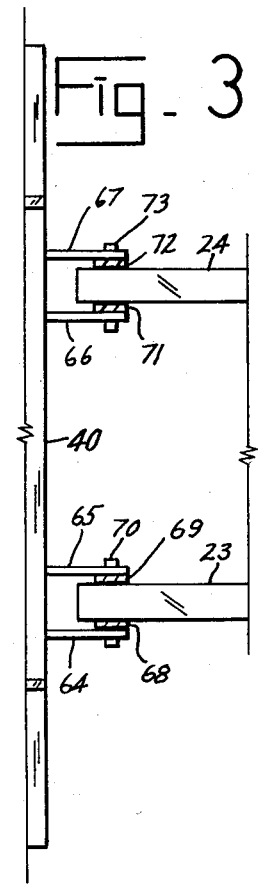
FIG. 3 is a partial plan view of the apparatus shown in FIG. 1, taken at line 3—3 of FIG. 1.

The hydraulic loader apparatus shown includes a pair of parallely disposed horizontally spaced arms 23, 24 each of which is angular at 25 (see also FIGS. 2–3). Each arm 23, 24 carries a bracket 27 from which is mounted a hydraulic cylinder 28 having shaft 29, the cylinder being pivotal at bracket 27 to which it is connected by pin 30. The arms 23, 24 are each supported at their inner ends by a pivotal connection (not shown) to the tractor, and each is pivotally movable by a hydraulic cylinder 33 having a shaft 34 connected at its outer end to a bracket 35 on each arm 23, 24 by a cross pin 36. The cylinders 33 may be operated to raise and lower the arms 23, 24 about their pivotal connections to the tractor. The hydraulic loader apparatus may, of course, be carried by a vehicle or device other than a tractor, but normally such apparatus will be mounted at the front end of a tractor. The loader apparatus does not, as such, form a part of the invention.

Figure 4:
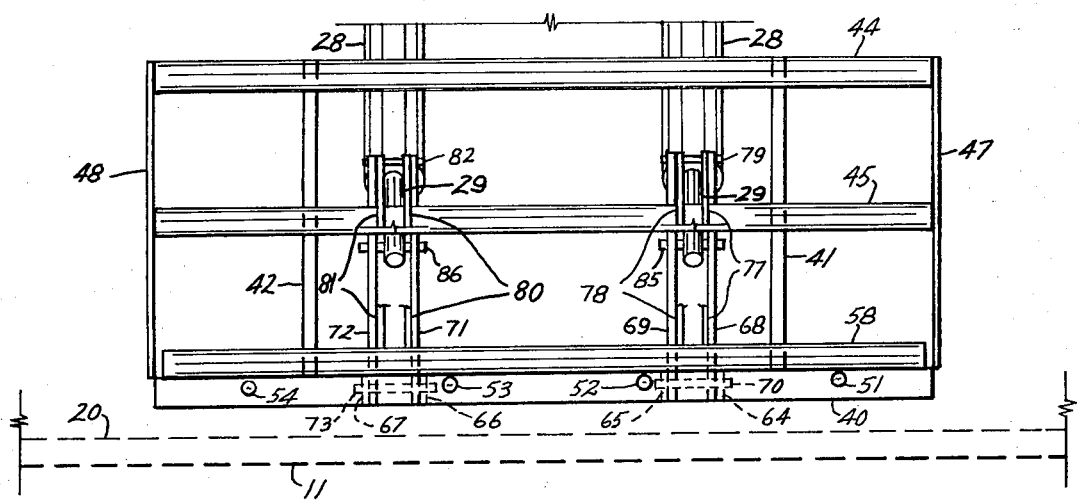
FIG. 4 is a front elevation of the apparatus shown in FIG. 1.

The apparatus provided by the invention includes a crossbar or beam 40 upwardly from which depend identical vertical supports 41, 42. The lower ends of vertical supports 41, 42 are affixed to crossbar 40 by welding or in other suitable manner. A pair of bars or pipes 44, 45 are affixed parallely spacedly to supports 41, 42 by welding or in other suitable manner. The ends of bars or pipes 44, 45 extend equally beyond the supports 41, 42, as is best shown in FIG. 4. Vertical bars 47, 48 are welded to the bar ends, and extend below bar 45, to prevent the bars from becoming engaged with objects or materials against which the bar ends may be scraped. In other words, bars 47, 48 serve as protectors at the ends of the bars 44, 45.

Cylindrical bars 51-54 are secured by welding or other suitable manner to crossbar 40. Crossbar 40 may have holes drilled thereinto into which the ends of bars 51-54 are inserted and welded in place, to maximize the strength of the connections of the bars to crossbar 40.

The outer ends of bars 51-54 are sharpened at 56, the tapers of the sharpened ends being extended over a substantial length of bars 51-54 as is best shown in FIG. 2, so that the sharpened bar ends will readily pierce bales of hay against which they are thrust.

Figure 5:
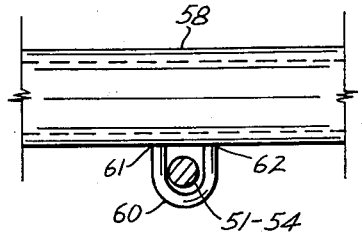
FIG. 5 is an enlarged partial vertical cross section of the apparatus shown in FIG. 1.
Figure 6:
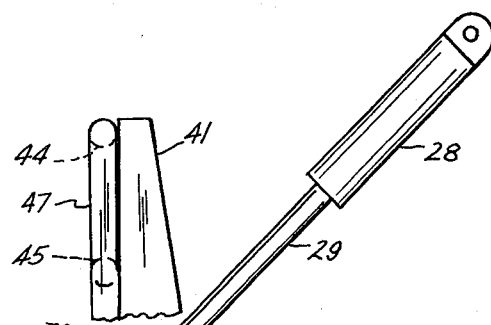
FIG. 6 is a side elevation of the apparatus shown in FIG. 1, shown in moved condition.

A lower bar or pipe 58 disposed transversely across bars 51-54 is movably coupled to the bars 51-54 by metal loops 60, each of which extends under one of the bars 51-54 and is welded to bar 58 at 61-62 at each side of the bars 51-54 (see FIG. 5). Bar 58 may slide along the length of the bars 51-54, from the base of each bar nearly to the end thereof. Crossbar 40 has welded thereto two spaced pairs of spaced brackets 64, 65 and 66, 67. Pivotal bars 68, 69 are pivotally connected to brackets 64, 65 by cross pin 70. Pivotal bars 71, 72 are similarly pivotally connected to brackets 66, 67 by cross pin 73. Pivotal bars 77, 78 are connected to the upper ends of bars 68, 69 by cross pin 79. Pivotal bars 80, 81 are connected to the upper ends of bars 71, 72 by cross pin 82. The lower ends of bars 77, 78 and 80, 81 are welded to bar or pipe 58. The ends of shafts 29 of cylinders 28 are respectively connected at intermediate elevations between bars 68 and 69 and between bars 71 and 72 by cross pins 85 and 86, respectively. Referring to FIGS. 1 and 6, when shaft 29 is withdrawn, bars 68, 69 and 71, 72 are moved to vertical positions with loops 60 against or close to cross bar 40 as in FIG. 1. When shafts 29 are extended, as in FIG. 6, bars 68, 69 and 71, 72 are pivoted angularly, and bars 77, 78 and 80, 81 push bar or pipe 58 outwardly on the bars 51-54. When shafts 29 are again withdrawn, loops 60 and bars 77, 78 and 80, 81 are moved to bring bar 58 back to beneath bars 44, 45.

It should be noted that bars 47 and 48 extend downwardly to cover the ends of bar 58 when it is in the non-extended position beneath bars 44, 45. In using the apparatus, the tractor or other vehicle which supports the apparatus is moved to adjacent a stack of bales of hay 90 to be moved. For example, in FIG. 1, the apparatus is positioned with bars 51-54 level or substantially level by manipulations of cylinders 33 and 28, the bars 51-54 being supported at loops 60 acting through bars 68, 69, 71, 72 and 77, 78, 80, 81. The bar or pipe 58 is in retracted position because of the positions of the angular bar members. The vehicle is moved to stab bars 51-54 into the stack of bales of hay 90 as shown in FIG. 1, until the hay is against all three bars 44, 45, and 58. Rail 18 keeps the bales from sliding on surface 20 of bed 11. Then, arms 23, 24 may be raised by operation of cylinders 33 with maintenance of the load in level condition effected by operation of cylinders 28. The vehicle may then be moved to the location to which the stack of bales of hay is to be taken, and the hay unloaded by withdrawing bars 51-54, this being assisted by extension of bar 58 through operation of cylinders 28.

Cylinders 28 function in two distinct fashions during operation of the apparatus. Cylinders 28 support and level the apparatus about its pivotal connections to arms 23, 24 at pins 70, 73 with or without a load when the apparatus is not otherwise supported. When the apparatus engaged with a load is supported upon the ground or a floor or other support, the cylinders 28 may be used to move bar or pipe 58 to extract the spikes 51-54 from bales of hay into which they have been thrust. Both of these functions are achieved using only the normal loader controls and hydraulic apparatus customarily provided on many farm tractors.

Hay may be loaded or unloaded and may be raised or lowered at any elevations within reach of the apparatus. The bars 51-54 may be moved to the proximity of the ground in order to lift a stack of bales of hay resting on the ground or near thereto. The hay may be loaded or unloaded at that location. Likewise, hay may be loaded or unloaded at intermediate and elevated positions. The described apparatus may be used to unload hay at a higher elevation than normally can be achieved with other apparatuses, because there is no portion of the apparatus which extends above the top of the stack of bales of hay. Therefore, hay may be loaded and unloaded in close proximity to or against the roof of a building without difficulty. In FIG. 1, it is shown that an additional stack of bales of hay 90a is disposed upon wagon 10 at the opposite side of the wagon from which the apparatus is disposed. The apparatus may reach across the bed of a trailer or other vehicle for this purpose. In other words, either stack 90 or 90a of bales of hay may be handled from either side of the trailer, this performance being limited only by the positions which may be reached with the tractor loader apparatus.

The apparatus which has been described is very simple and efficient in operation. The operator of the tractor or other conveying vehicle need operate only the normal loader controls for the hydraulic cylinders. Additional hydraulic systems are not necessary to the invention in its structure or use, so a lesser degree of training is required with other systems involving more complicated hydraulic systems. The apparatus is economical in manufacture due to the fact that additional hydraulic systems are not required.

The hay transported by the apparatus is fully supported whereby dropping of loads is not likely to occur. Penetration of the bales of hay with the bars or spikes 51-54 does no damage to the bales of hay and maintains the bales of hay in good condition. It should be noted that the apparatus may be operated for lifting loads from unlevel areas or for depositing loads onto unlevel areas, since spikes 51-54 may penetrate a bale anywhere within the height of the bale. Therefore, unlevelness of the surface upon which the apparatus is working is no detriment to its satisfactory performance.

While a preferred embodiment of the apparatus according to the invention has been described and shown in the drawings, many modifications thereof may be made by a person skilled in the art without departing from the spirit of the invention, and it is intended to protect by Letters Patent all forms of the invention falling within the scope of the following claims.

I claim:

1. Hay handling apparatus, comprising support means having plural horizontally spaced parallel horizontal spike means depending therefrom and having pivotal connection means and having stop means supported thereby for supporting bales of hay fully engaged by said spike means, said spike means being adapted to piercingly engage bales of hay to support said bales of hay, said pivotal connection means being adapted to releasably pivotally engage pivotally upwardly and downwardly movable arm means of a vehicle loader supporting the apparatus whereby the apparatus may be raised and lowered and may be transported between different locations by said vehicle, pusher means slidably connected to said spike means transversely above said spike means, first pivotal means pivotally connected at one end to said support means, second pivotal means depending from said pusher means and being pivotally connected to the other end of said pivotal means above said support means, said first pivotal means being releasably connected spaced from its said pivotal connection to said support means to generally horizontally reciprocably movable means of said vehicle loader whereby said first pivotal means may be pivotally moved toward and away from said vehicle loader to move said pusher means between a retracted position adjacent said stop means and an extended position along said spike means spaced from said stop means to disengage said bales of hay from said spike means onto a ground or floor surface or onto a stack of bales in level dispositions, said first and second pivotal means being movable by said generally horizontally reciprocably movable means to pivotally rotate said support means and said spike means to maintain said spike means in approximately horizontan dispositions during upward and downward movements of said support means by said movable arm means.

2. The combination of claim 1, said spike means comprising plural elongate bar means sharpened at their ends away from said support means.

3. The combination of claim 2, said support means comprising an elongate bar disposed transversely of said loader means, said pivotal connection means comprising perforate bracket means having first pin means removably disposed through said perforations.

4. The combination of claim 1, said stop means comprising vertical support means depending upwardly from said support means and first elongate means affixed horizontally across said vertical support means.

5. The combination of claim 4, said pusher means comprising second elongate means parallely spaced from said first elongate means and being disposed beneath said first elongate means when in said retracted position.

6. The combination of claim 5, said first and second elongate means each comprising an elongate metal bar.

7. The combination of claim 5, said first and second elongate means each comprising a length of pipe.

8. The combination of claim 5, said first elongate means having vertical guard means affixed to its opposite ends to prevent engagement of said first elongate means with objects scraped thereby.

9. The combination of claim 8, said guard means extending over the ends of said second elongate means when said second elongate means is in its said retracted position whereby said guard means prevents engagement of said second elongate means with objects scraped thereby.

10. Hay handling apparatus, comprising support means having plural horizontally spaced parallel horizontal spike means depending therefrom and having pivotal connection means and having stop means supported thereby for supporting bales of hay fully engaged by said spike means, said spike means being adapted to piercingly engage bales of hay to support said bales of hay, said pivotal connection means being adapted to releasably pivotally engage pivotally upwardly and downwardly movable arm means of a vehicle loader supporting the apparatus whereby the apparatus may be raised and lowered and may be transported between different locations by said vehicle, pusher means slidably connected to said spike means transversely above said spike means, first pivotal means pivotally connected at one end to said support means, second pivotal means depending from said pusher means and being pivotally connected to the other end of said first pivotal means above said support means, said first pivotal means being releasably connected spaced from its said pivotal connection to said support means to generally horizontally reciprocably movable means of said vehicle loader whereby said first pivotal means may be pivotally moved toward and away from said vehicle loader to move said pusher means between a retracted position adjacent said stop means and an extended position along said spike means spaced from said stop means to disengage said bales of hay from said spike means, said spike means comprising plural elongate bar means sharpened at their ends away from said support means, said support means comprising an elongate bar disposed transversely of said loader means, said pivotal connection means comprising perforate bracket means having first pin means removably disposed through said perforations, pivotal connection of said support means comprising perforations through said one end of said first pivotal means adapted to removably receive said first pin means.

11. The combination of claim 1, 2, 3, 10, 4, 5, 6, 7, 8, or 9, said spike means being disposed over a length transverse thereto sufficient for said spike means to pierce plural side by side bales of hay, whereby said apparatus may be used to lift and transport and deposit plural bales of hay simultaneously and to lift and transport and deposit stacked bales of hay of plural bale width and plural bale height.

12. The combination of claim 10, said spike means being disposed over a length transverse thereto sufficient for said spike means to pierce plural side by side bales of hay, whereby said apparatus may be used to lift and transport and deposit plural bales of hay simultaneously and to lift and transport and deposit stacked bales of hay of plural bale width and plural bale height.

13. Hay handling apparatus, comprising plural parallel horizontally disposed spike means adapted to pierce baled hay, means transverse to said spike means movable to disengage said spike means from said baled hay, body means for supporting said spike means and for moving said spike means vertically while maintaining said spike means horizontally disposed, said body means being releasably connectable to a front end loader device, said means transverse to said spike means being movable by operation of thrust means of said front end loader device, pivotably movable means connected to said transverse means and to said thrust means to produce said movement of said transverse means upon operation of said thrust means, said transverse means being movably connected to said spike means by slidable link means, said spike means being supported and maintained horizontally disposed by force exerted by said thrust means through said link means.

14. The combination of claim 13, said spike means being disposed over a length transverse thereto sufficient for said spike means to pierce plural side by side bales of hay, whereby said apparatus may be used to lift and transport and deposit plural bales of hay simultaneously and to lift and transport and deposit stacked bales of hay of plural bale width and plural bale height.

* * * * *